L. D. HUBBELL.
FLEXIBLE CONNECTION FOR SHAFTS AND THE LIKE.
APPLICATION FILED JULY 24, 1906.
1,034,453.
Patented Aug. 6, 1912.
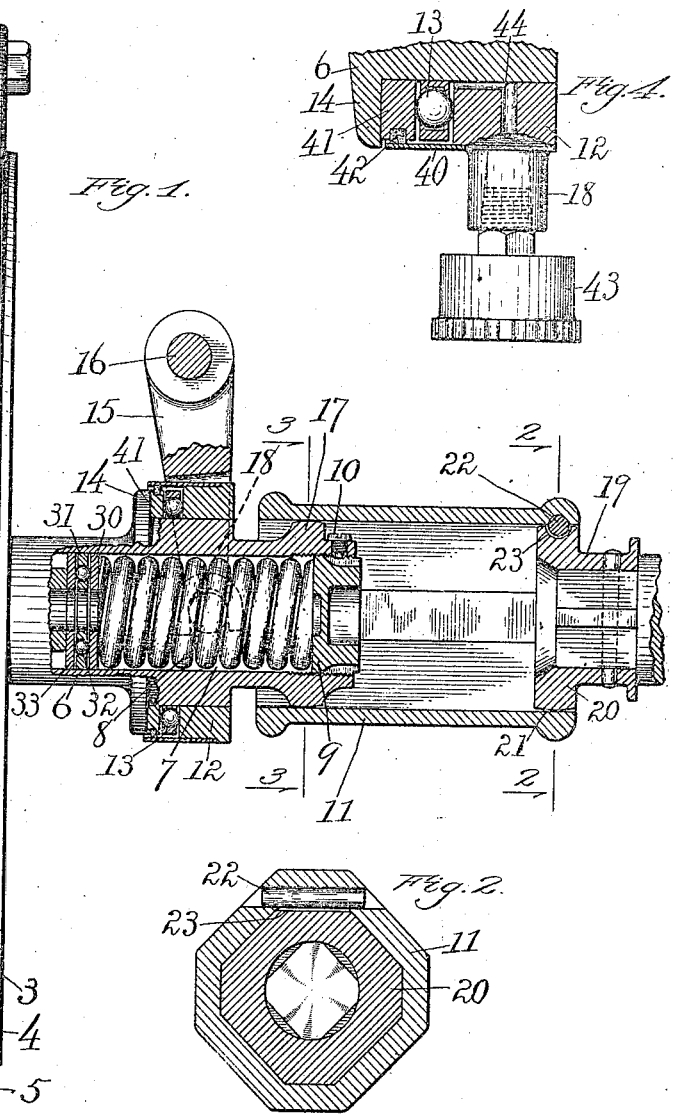
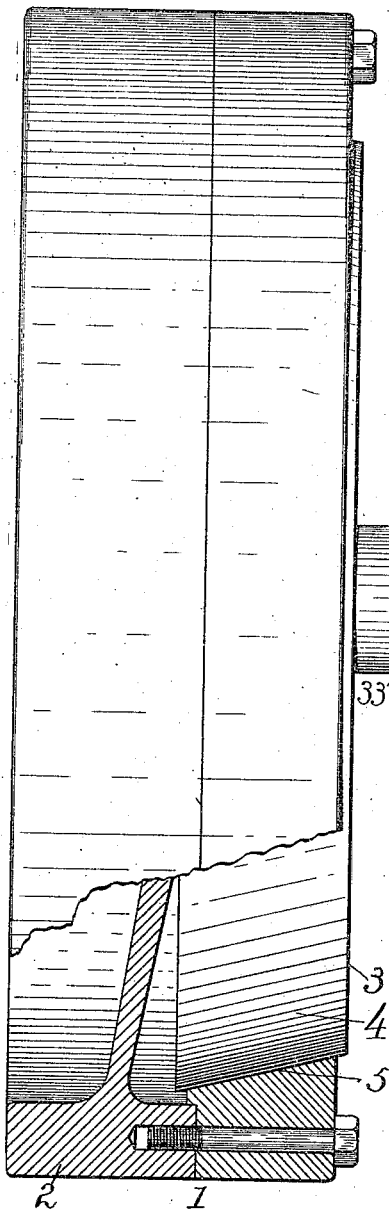
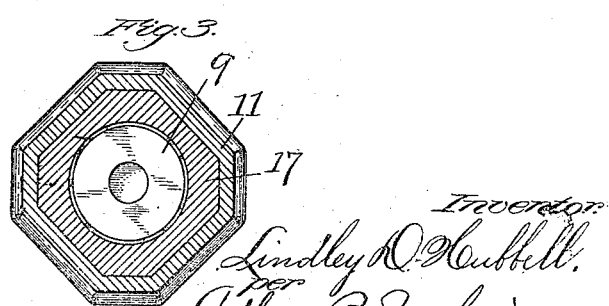
Witnesses.
Inventor.
Lindley D. Hubbell.
Arthur B. Jenkins,
Attorney.

UNITED STATES PATENT OFFICE.

LINDLEY D. HUBBELL, OF HARTFORD, CONNECTICUT, ASSIGNOR TO THE POPE MANU-
FACTURING COMPANY, OF HARTFORD, CONNECTICUT, A CORPORATION OF CON-
NECTICUT.

FLEXIBLE CONNECTION FOR SHAFTS AND THE LIKE.

1,034,453.   Specification of Letters Patent.   Patented Aug. 6, 1912.

Application filed July 24, 1906. Serial No. 327,571.

*To all whom it may concern:*

Be it known that I, LINDLEY D. HUBBELL, a citizen of the United States, and a resident of Hartford, in the county of Hartford and State of Connecticut, have invented a new and Improved Flexible Connection for Shafts and the Like, of which the following is a specification.

My invention relates more especially to devices for connecting shaft sections or the like, and the object of my invention is to provide a device of this class that while allowing perfect freedom to the shaft in its turning movement yet at the same time shall allow the parts of the shaft sections to be out of alinement to a greater or less extent; and a further object of the invention is to provide a device of this class that will allow a greater or less variation in the location of the parts to be united with respect to the distance from each other; and a further object is to provide a device of this class that shall include in one structure means whereby a greater or less variation in the location of the parts to be united, both as regards the distance between the parts and also as to their location in an axial line shall be permitted; and a still further object of the invention is to provide a device in which the clutch members shall be preserved at all times in perfect alinement so that there is proper contact at all points about the peripheries of the clutch parts, thus insuring the greatest effectiveness in operation. A form of device in the use of which these objects may be attained is illustrated in the accompanying drawings, in which—

Figure 1 is a view in side elevation of the clutch and connection therebetween and the transmission gearing of a motor vehicle, parts being broken away to show construction. Fig. 2 is a detail view in cross-section on the line 2—2 of Fig. 1. Fig. 3 is a detail view in cross-section on the line 3—3 of Fig. 1. Fig. 4 is a detail view on enlarged scale showing the lubricating device.

My improvement finds ready application to many different structures in which two shaft sections are to be united, as the device will allow such sections perfect freedom of rotary movement while the parts may not be strictly in axial alinement. The device is especially applicable in the construction of motor vehicles in which the different parts are more or less liable to be slightly out of alinement in the setting up of the mechanism, and in which they are frequently temporarily thrown out of alinement under the peculiar uses to which such a vehicle is subjected, causing a springing action to the frame, and such a device has therefore been chosen by me as one in connection with which my invention may be readily illustrated.

In the accompanying drawings the numeral 1 denotes as a whole a clutch of a form commonly used in the construction of motor vehicles, this clutch including a driving part 2 and a driven member 3. The latter has a friction surface 4 which contacts with a friction surface 5 on the driving part. In mechanism of this character the driven clutch member 3 is constantly held in contact with the driving clutch part 2 as by means of a spring except when force is applied to release the pressure of the spring. In applying my improvement to such a mechanism an extension 6 is provided on the driven member 3, this extension forming one of the members of the flexible connection. A chamber 7 is formed centrally in this extension, in which is located a spring 8. This spring rests at one end against a plate 30 forming a portion of a thrust bearing which includes a ball ring 31 within which balls 32 are located, these balls resting against a ring 33 backed up or supported by a projecting part from the driving member 2 lying within the extension 6, and the opposite end of the spring which is under tension is forced against a stop 9. This stop is screw-threaded into the walls of the chamber 7 and serves as a means for regulating the tension of the spring, a set screw 10 holding the stop in any desired position of adjustment.

A collar 12 is secured to the extension 6, and for the purpose of securing ease of movement of the parts ball bearings 13 are located between this collar and a hardened steel ring 41 carried by the flange 14. A fork 15 secured to a rock shaft 16 engages trunnions 18 on the collar 12. By means of a foot lever the shaft 16 may be operated to swing the fork 15 and thus move the clutch members apart and against the force of the spring 8. An oil casing 40 attached to the collar 12, is provided for the bearings 13.

while a washer 42, located in a groove in the periphery of the ring 41 serves to prevent the escape of lubricant from within the oil casing and also prevents the entrance of dust or dirt thereinto. One of the trunnions 18 is provided with an opening within which is secured an oil cup. This oil cup is of well-known construction, including a cap 43 by means of which lubricant, usually in a plastic condition, is forced through the channel 44 to the bearings 13.

The connection as a whole includes a driving member and a driven member, and a connecting sleeve, which parts may be variously constructed to embody my invention. In the form of the invention illustrated herein a rib 17 is formed on the outer surface of the extension 6, and the opening in the sleeve and this rib are shaped in cross-section to correspond, the form of the parts in cross-section being non-circular, so that when the extension 6 is rotated a like movement is imparted to the sleeve. As illustrated, this form in cross-section is octagonal, or in general appearance square and reduced at the corners. The rib 17 is rounded as plainly shown in Fig. 1 so that a tipping or pendulum action is permitted, and in addition thereto the extension 6 is allowed a longitudinal movement within the sleeve.

The driven member 19, in the device shown herein, is that part of the shaft extending to or connected with the transmission gearing, and this end of the sleeve 11 and the part 19 are also similarly formed in the cross-section to compel simultaneous rotary movement, the parts being non-circular in form. As herein illustrated, the opening in the sleeve 11 is of the same general form from end to end, although I do not intend to limit myself to such construction.

The driven member 19 has a flange 20 which is curved as at 21 to allow pendulum movement of the parts relative to each other. In order to prevent separation of the parts at this point a pin 22 is passed through the sleeve 11, as plainly shown in Fig. 2, this pin lying within a recess 23 in the flange 20. This recess is slightly larger than the pin 22, as shown in Fig. 1, so that a certain freedom of movement is allowed to the member 19 in its pendulum action and while the part may swing on the pin as a pivot, this space provided by the recess 23 and the smaller pin 22 also allows a certain limited swinging movement in a transverse direction.

The end of the driven member 19 and the projection 6 are located a sufficient distance apart so that the spring 8 may be easily removed. To accomplish this it is necessary only to remove the pin 22 and slip the sleeve backward on the part 19.

The stop 9 may now be removed by a proper tool inserted within the opening in the stop, which allows a limited movement of the part 6 forward, enabling the spring to be removed by passing it through the opening between the ends of the driven member 19 and the projection 6.

The loose connection between the projection 6 and the sleeve 11 allowing sliding movement of the one part within the other provides for the proper axial movement of the clutch parts for engagement and disengagement, and also in addition thereto, features hereinbefore set out.

From this description it will be noted that this construction constitutes a form of universal joint in which a lateral movement in different directions is provided for the driving member and a like movement in different directions is also provided for the driven member, so that the parts located on opposite sides of this connection may be located to a greater or less extent out of axial alinement and yet be allowed perfect freedom of rotating movement by reason of the peculiar construction of the connection.

What I claim as my invention and desire to secure by Letters Patent is:—

1. In a flexible connection a sleeve having an opening of uniform size in transverse section from end to end, said opening being composed of several flat bearing surfaces extending one from the other in a circumferential direction in continuation of the inner surface of the sleeve, a driving member and a driven member projecting into said sleeve, one of said members having a flange with bearing surfaces formed to the same shape as those on the inner surface of the sleeve, the several edges of said flange being curved lengthwise to permit tipping movement within the sleeve, and the other of said members having a groove in one edge and its opposite edge rounded to provide a bearing surface, and a pin located in said groove and in a corresponding groove on the inner surface of the sleeve.

2. In a flexible connection, a sleeve having an opening non-circular in cross-section, a driving member and a driven member projecting into said sleeve, one of said members having a flange with bearing surfaces of the same shape as those on the inner surface of the sleeve, the several edges of said flange being curved lengthwise to permit tipping movement within the sleeve, and the other of said members having a groove in one edge and its opposite edge rounded to provide a bearing surface, and a pin located in said groove and a corresponding groove on the inner surface of the sleeve.

3. In a flexible connection, a sleeve having an opening non-circular in form in cross-section, a driving member and a driven member projecting into said sleeve, each of said members having a flange with bearing surfaces of the same shape as those on the inner surface of the sleeve and curved lengthwise to permit tipping movement within the sleeve, one of said flanges having a groove in one edge, and a pin located in said groove and in a corresponding groove on the inner surface of the sleeve.

4. In a flexible connection, a sleeve having an opening non-circular in form in transverse section, a driving section and a driven section projecting within said sleeve, and each closely fitting the same at all points therearound the engaging surfaces of the sleeve and sections being formed to permit relative tipping movement of said parts, and means for pivotally attaching the sleeve to a shaft section at one side of the axis thereof.

This specification signed and witnessed this thirteenth day of July A. D., 1906.

LINDLEY D. HUBBELL.

Signed in the presence of—
L. H. KELTING,
A. M. HOLCOMBE.

---

Copies of this patent may be obtained for five cents each, by addressing the "Commissioner of Patents, Washington, D. C."